Oct. 5, 1948.    J. W. FRASER ET AL    2,450,423
TERMINAL STRUCTURE
Filed Aug. 1, 1944
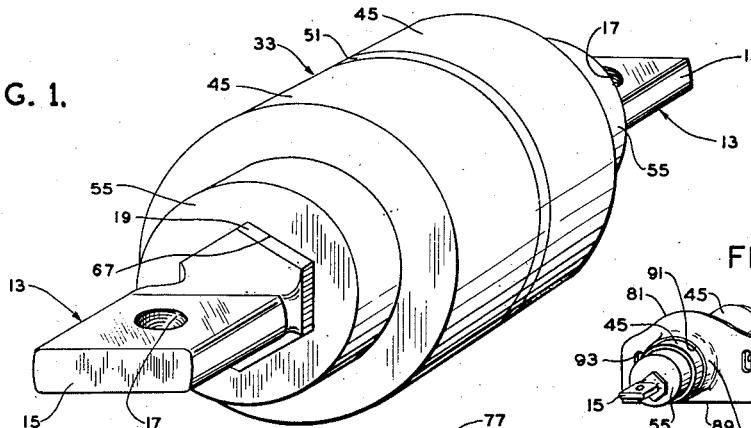
FIG. 1.
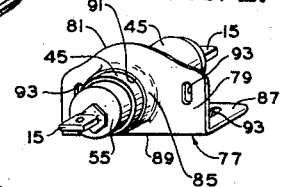
FIG. 2.
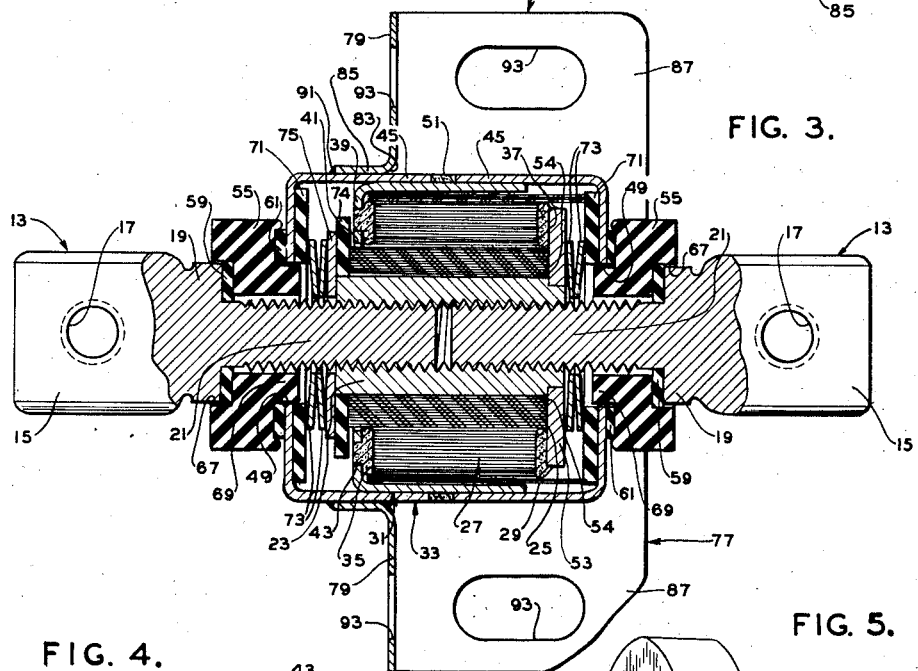
FIG. 3.
FIG. 4.
FIG. 5.
INVENTORS.
JOHN W. FRASER.
LOUIS GORDON.
BY
William D. Hall
ATTORNEY.

UNITED STATES PATENT OFFICE 2,450,423

TERMINAL STRUCTURE

John W. Fraser, Detroit, Mich., and Louis Gordon, Eatontown, N. J.

Application August 1, 1944, Serial No. 547,622

4 Claims. (Cl. 174—77)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to capacitors.

In electrical capacitors for some purposes it is desirable to reduce to a minimum the overall impedance to high frequency currents. This is of particular importance in capacitors used in the suppression of high frequency noises in power lines running to radio equipment and the like. In such capacitors, not only must the impedance of the capacitor itself be made as small as possible, but also the impedance of the leads between the capacitor and the circuit and between the capacitor and ground must be eliminated entirely or at least be so reduced as to be negligible.

We have found that our capacitor, such as in the embodiment hereinafter described, accomplishes the foregoing purposes most satisfactorily. Also, it is a completely practical unit in that it is impervious to moisture, oil and dirt and it has sufficient mechanical strength to stand the abuse, and mechanical vibrations and shocks that such a unit may receive in actual use, particularly when in a mobile vehicular installation.

We obtain the low impedance of the capacitor preferably by using a rolled metal foil capacitor, which is hollow throughout its central portion so as to have a relatively large inside diameter, and which has a large outside diameter in relation to its length.

In the lower frequencies the overall impedance of a roll type capacitor will decrease with any increase in frequency. However, when we get into the higher frequencies, where "skin-effect" comes into play, it causes an increase in the inductive reactance of the capacitor to such an extent that the overall impedance increases rather than decreases with any increase in frequency. Impedance measurements of individual layers of foil of a roll type condenser, at the higher frequencies, indicate that the greater the diameter of the layer, the lower the impedance. At very high frequencies, such a condenser may be considered to consist of conducting layers or laminae in parallel much as though there were no insulation between laminae as in an ordinary solid conductor. The inner laminae being linked with the greater flux obviously have the higher impedance and the current is carried mainly in the outer layers. In a solid conductor at high frequencies, the entire current is diverted to the outer surface and the phenomena is known as "skin-effect." The same thing happens in a roll type capacitor except that the capacitive reactance between layers is a stabilizing effect and prevents to some extent the complete diversion of the current to the outer layer as in the case of a solid conductor. Hence the overall impedance of a roll type condenser is decreased if it is rolled about a cylindrical form so that layers of very small diameter are eliminated entirely, and are replaced by layers of larger diameter so as to retain the desired capacity. Also, the overall impedance is reduced if the length of the roll is shortened, as this effects a reduction in the inductance of each layer of foil. Therefore, a roll type capacitor, hollow throughout its central portion and of large outside diameter and short length, is found to have a lower overall impedance at high frequencies than a narrower and longer capacitor. We have found that, to obtain the advantages of our design, for frequencies in excess of 20 megacycles, the ratio of the inner diameter to the outer diameter of the roll should be preferably in excess of .5 and the outer diameter should be greater than the length.

This advantageous reduction in impedance at the higher frequencies, however, will be counteracted if any appreciable impedance is introduced due to the inductance of the leads between the circuit and the capacitor and between the capacitor and ground. The problem of reducing the inductance of the lead between the circuit and the capacitor is satisfactorily solved by bringing the line of the circuit, to which the capacitor is to be connected, directly through the axis of the tubular roll capacitor, by making said line of relatively large diameter where it passes through the capacitor, and by connecting one foil of the capacitor directly to said line. The inductance between the capacitor and ground is similarly reduced by connecting the other foil of the capacitor directly to a metallic housing surrounding the capacitor, and by connecting the metallic housing directly to ground with a low inductance mounting bracket. Such construction effects a practical elimination of the inductances of connecting leads.

Our capacitor is made impervious to moisture, dirt and oil by closing each opening with a seal of solder or resilient gaskets, the gaskets being so installed that they can not loosen up. The capacitor is protected against shock and vibration by sustaining the capacitor section within the housing entirely by mechanical means rather than by filling compounds. The parts are so shaped and arranged that once the capacitor is closed and sealed it will not be opened up by any amount of vibration it may receive in use.

In the drawings,

Figure 1 is an oblique view of a capacitor embodying the present invention;

Figure 2 is a similar view, reduced in size, of said capacitor installed in a low impedance mounting bracket;

Figure 3 is an enlarged horizontal cross-section of the capacitor and mounting bracket of Figure 2;

Figure 4 is a right end view of the cup of Figure 3; and

Figure 5 is a perspective view of one of the insulating bushings of said capacitor.

The capacitor shown in the drawings has two metal terminals 13, each of which comprises a flattened lug 15 pierced transversely by a threaded aperture 17, a hexagonally shaped shoulder 19, and an externally threaded stud 21. Said terminals 13 are threadably joined to the opposite ends of an internally threaded cylindrical metal sleeve 23. Axially positioned in successive layers about said sleeve 23 are, first, an insulating tube 25, then a capacitor section 27, then another and larger insulating tube 29, then a metal connecting cup 31 and finally a metal housing 33. The insulating tubes 25 and 29 may be of any suitable material; we prefer laminated fibrous material. The tube 25 acts as a mandrel about which the capacitor section 27 is rolled. The capacitor section 27 is a rolled foil capacitor, having an outside diameter greater than its length. It is made up of two long strips of metal foil, separated by insulating material, rolled into a tubular shape. The two foils, respectively making up said capacitor section 27, extend outward longitudinally beyond the roll at opposite ends of said capacitor section, and the foil so extending out at each end is crushed together and built up with solder so as to form an annulus of solder 35, 37 at each end of the capacitor. In this way all of the turns or layers of one of the strips of metal foil are connected together by one annulus of solder 35, and the layers of the other strip are similarly joined together by the other annulus 37.

The connecting cup 31 (Figures 3 and 4) is a cylindrical cup, the base 39 of which is pierced by an axial, circular aperture 41, and a plurality of elongated solder holes 43 spaced about said aperture 41. The housing 33 comprises two identical cylindrical caps 45 joined together around their circumferential edges by a ring shaped solder seal 51, the end of each cap being pierced by a hexagonal aperture 49. Said solder seal 51 also securely joins the connecting cup 31 and the housing 33. The annulus of solder 35, at the left end of the capacitor section 27 (Figure 3) is soldered to the cup 31, the elongated solder holes 43 facilitating the soldering operation.

The right end of the sleeve 23 is externally rabbeted to receive a metal washer 53, said washer being secured to said sleeve by a ring of solder 54 and also being soldered to the right annulus of solder 37. The ends of the housing 33 are insulated from the terminals 13 and the interior of said housing is sealed against moisture, oil and dirt by insulating bushings 55 (see Figure 5) of rubber or the like and sealing washers 59 and 61 of "corprene" or other suitable material. Each of said insulating bushings 55 is circular inside and outside and has an axially disposed, hexagonally-shaped recess 67 at one end and an axially disposed, hexagonally-shaped projection 69 at the other. Within the housing 33, at each end, are an insulating washer 71 of linen "Bakelite" or other suitable material and two steel spring washers 73. About the left end of the sleeve 23 is an insulating washer 74 and just to the left of it is a metal washer 75.

After all of the parts have been assembled the last step is to put in the ring shaped solder seal 51. Once this is done, the capacitor is permanently sealed as the two housing caps 45 then form the unitary housing 33 and the terminals 13 are kept from unscrewing by the hexagonal fit between said terminals and the insulating bushings 55 and between said bushings and the housing caps 45. The parts within the capacitor are all maintained in their proper positions by the several soldered connections aforesaid and the spring washers 73. Said spring washers 73 also assist in keeping a proper seal between the housing 33 and the terminals 13 by maintaining a pressure against the inside of the housing.

In our capacitor the housing 33 forms one terminal. Connection between said housing and ground must be made without the introduction of impedance. We prefer a mounting bracket which surrounds and grips the housing 33 and establishes direct contact to ground. One embodiment of such a mounting bracket is shown in the drawings (Figures 2 and 3). Said bracket 77 may be made of sheet metal. It comprises a flat body portion 79, generally rectangular in shape, but rounded at its upper edge 81. The body portion 79 is pierced by a circular aperture 83, the metal about the aperture being rolled outward, normal to the body portion 79, to form a flange-like circular collar 85. A base plate 87 of flat sheet metal extends perpendicularly from the lower edge 89 of the body portion 79. The lower edge of the aperture 83 is close to the lower edge 89 of the body portion 79 so that the electrical path between the collar 85 and the base plate 87 is as short as possible. The collar 85 is of a size to make a snug fit completely about the outer periphery of the housing 33 aforementioned, preferably in the region where the cup 39 makes contact with the inside of housing 33 (see Figure 3), the desideratum being to obtain the shortest possible electrical path between the annulus of solder 35 aforementioned and the collar 85. The collar 85 is securely sweated to the housing 33 by a ring of solder 91. The body portion 79 and the base plate 87 are provided with several mounting holes 93 so that the mounting bracket 77 may be fastened to ground in any convenient position. This type of mounting bracket combined with our capacitor provides a short direct path from the capacitor section 27 to ground, the impedance of which is so infinitesimal as to be negligible.

In the operation of the capacitor described, the line of the circuit, which is to be cleared of high frequency noises, is caused to pass through the capacitor so that the two terminals 13 and the sleeve 23 actually become part of the line. Thus, the lead from said line to the capacitor section 27, being the washer 53, is very short and of very little inductance. If desired, this lead may be further shortened by increasing the outside diameter of the sleeve 23 and the inside diameter of the insulating tube 25. As already explained the lead from the capacitor section 27 to ground is similarly of negligible inductance. Hence, the complete capacitor interposes a minimum overall impedance to high frequency currents between the circuit and ground.

While there has been described what is at present considered the preferred embodiment of the invention, it will be obvious to those skilled in the art that various changes and modifications may be made without departing from the invention.

We claim:

1. A casing-terminal structure for a capacitor comprising a metallic housing surrounding said capacitor, said housing including two cylindrical housing caps provided with non-circular openings at their outer ends, said caps being of like diameter and facing each other, and said caps and openings being coaxial; a cylindrical cup of an outside diameter to form a snug slidable fit within both housing caps; an electrical terminal extending through each of said openings and provided with non-circular shoulders; means to lock said terminals against relative longitudinal movement; a resilient gasket means interposed between the outer end of each of the housing caps and the associated terminal to make a moistureproof seal between the said housing cap and the said terminal, each of said gasket means being provided with a non-circular projection adapted to engage the non-circular opening in one of the housing caps aforesaid and with a non-circular recess adapted to engage the non-circular shoulders on one of the electrical terminals aforesaid.

2. A casing as defined in claim 1, wherein spring means are disposed within the housing caps to urge the ends of the caps outwardly against the gasket means to contribute to the maintenance of tight engagements between said gasket means and the housing caps and terminals.

3. A casing-terminal structure for a capacitor comprising two externally threaded electrical terminals spaced from each other and coaxially disposed; an internally threaded sleeve in threadable engagement with said terminals; a cylindrical housing of conducting material surrounding said capacitor, said housing comprising two caps disposed in spaced opposing relationship and coaxial with said terminals; a cup within said housing, of a size to allow it to make a snug sliding fit within the two caps aforesaid during assembly; an annular solder seal between the said cup and each of said caps; resilient gasket means between said housing and the electrical terminals aforesaid to keep the capacitor substantially free from moisture and dirt; and means to prevent relative movement of the electrical terminals and the housing, said last named means including means on the housing and the gaskets to engage with each other and prevent relative rotation therebetween and means on the gaskets and the electrical terminals to engage with each other and prevent relative rotation therebetween.

4. A casing as defined in claim 3, wherein spring means are disposed within the housing caps to urge the ends of the caps outwardly against the gasket means to contribute to the maintenance of tight engagements between said gasket means and said housing caps and terminals.

JOHN W. FRASER.
LOUIS GORDON.

REFERENCES CITED

The following references are of record in the file of this patent:

UNITED STATES PATENTS

| Number | Name | Date |
|---|---|---|
| 979,652 | Church | Dec. 27, 1910 |
| 1,404,958 | Hobbs | Jan. 31, 1922 |
| 1,494,234 | Gossett | May 13, 1924 |
| 1,726,543 | Curtis | Sept. 3, 1929 |
| 1,896,143 | Norviel | Feb. 7, 1933 |
| 2,052,700 | De Lange | Sept. 1, 1936 |
| 2,194,502 | Hower | Mar. 26, 1940 |
| 2,270,953 | Manz | Jan. 27, 1942 |
| 2,346,162 | Hanopol | Apr. 11, 1944 |
| 2,383,890 | Robinson | Aug. 28, 1945 |

FOREIGN PATENTS

| Number | Country | Date |
|---|---|---|
| 205,660 | Switzerland | Sept. 16, 1939 |
| 214,341 | Switzerland | July 16, 1941 |
| 217,144 | Switzerland | Jan. 16, 1942 |
| 379,073 | Great Britain | Aug. 25, 1932 |